July 26, 1932.   J. MACCALLUM, JR., ET AL   1,868,535
LIQUID INDICATING DEVICE
Filed July 14, 1922   2 Sheets-Sheet 1
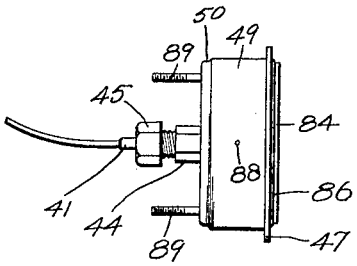
Fig. 1
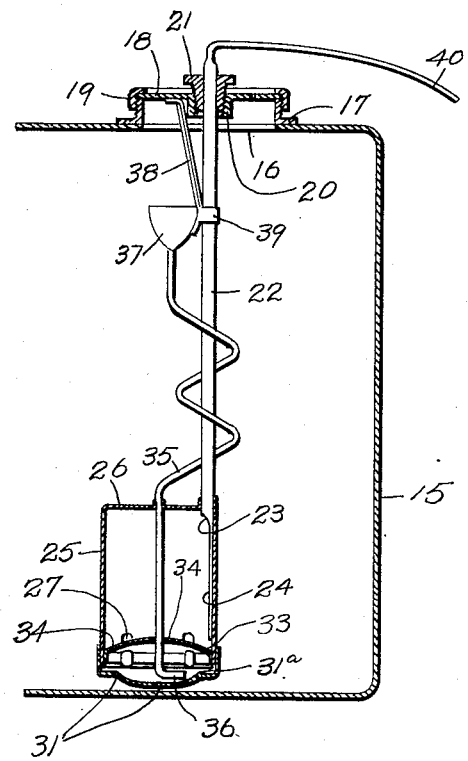
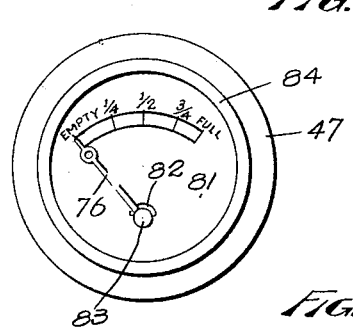
Fig. 4
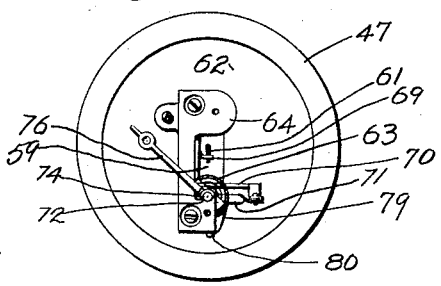
Fig. 5
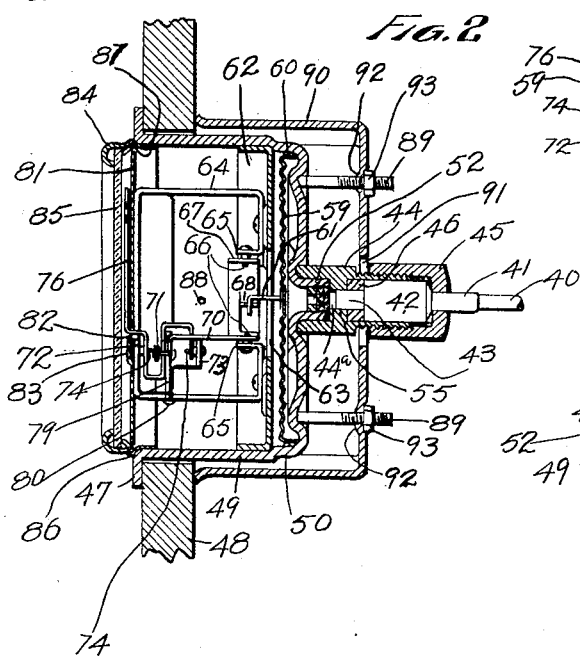
Fig. 2
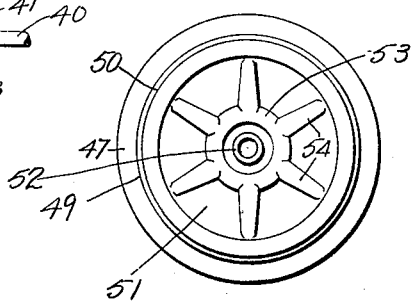
Fig. 6
INVENTORS
JAMES MACCALLUM JR.
EDWARD R. POWELL
BY Edward C. Longan
ATTY.

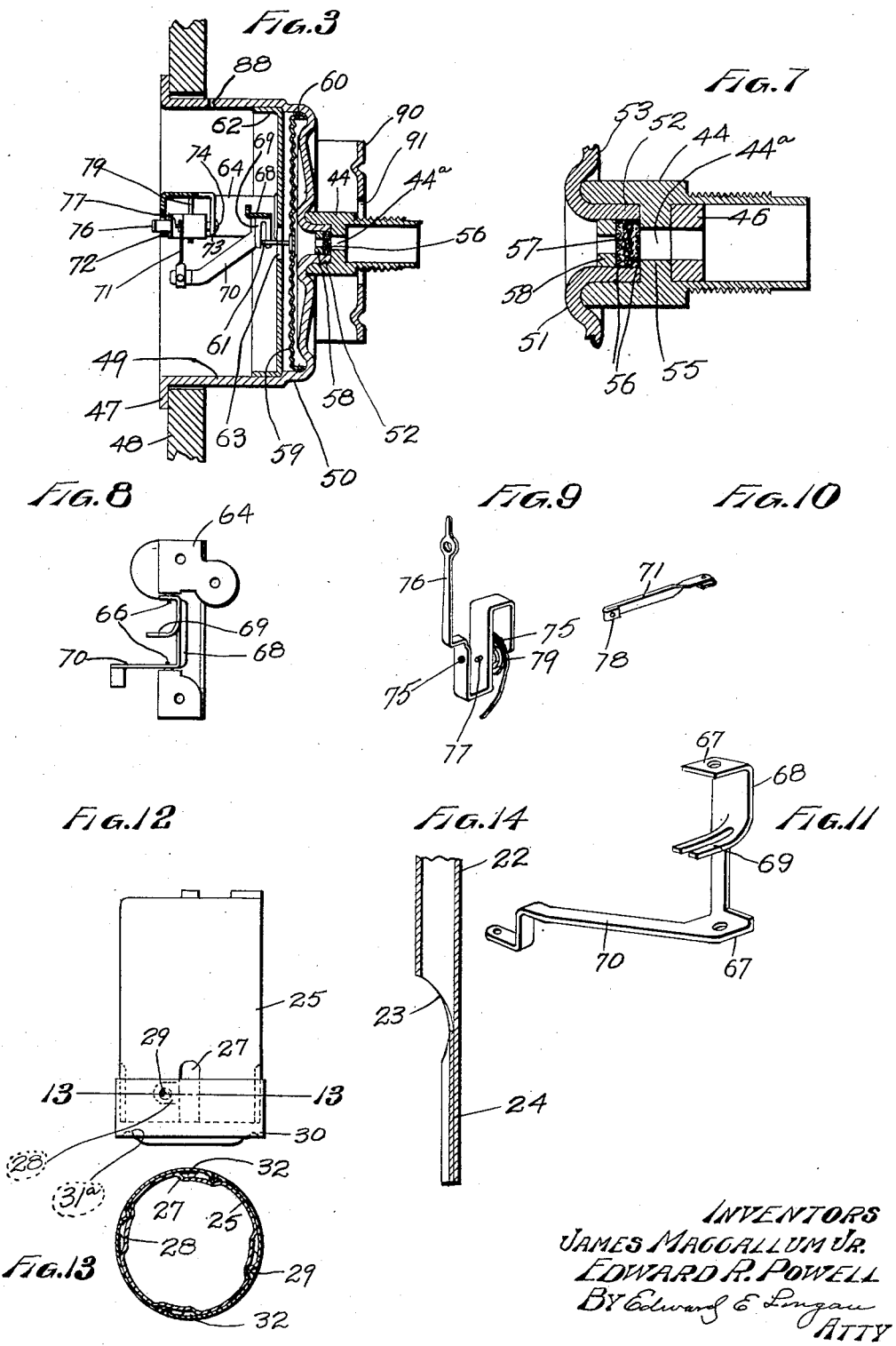

Patented July 26, 1932

1,868,535

UNITED STATES PATENT OFFICE

JAMES MACCALLUM, JR., AND EDWARD R. POWELL, OF ST. LOUIS, MISSOURI; SAID POWELL ASSIGNOR TO SAID MACCALLUM

LIQUID INDICATING DEVICE

Application filed July 14, 1922. Serial No. 574,876.

Our invention relates to improvements in liquid and pressure indicating devices, and has for its primary object a gage which will indicate the amount of liquid or pressure contained within a container, and which is sensitive enough to indicate the difference in pressure caused by very slight variations of the quantity of liquid within the container.

A further object is to provide a pressure gage which is adapted to be secured to a pressure chamber, the pressure in the chamber being caused by the liquid within a storage tank, and this pressure transferred to a pressure gage which will indicate the difference in pressure of small fractions of a pound per square inch, which is occasioned by the variations of level of the liquid within the tank.

A still further object is to construct a pressure gage which is so arranged that the entrance and exit of the pressure carrying medium to the gage is gradual so that no violent, or rapid action of the moving parts takes place.

In the drawings,

Fig. 1 is a side elevation of my device, showing the same in connection with a liquid container, with portions broken away and in section.

Fig. 2 is an enlarged vertical cross section through the gage.

Fig. 3 is an enlarged horizontal cross section of the same.

Fig. 4 is a face view of the gage.

Fig. 5 is a similar view with the glass and indicating dial removed.

Fig. 6 is a rear plan view of the gage housing.

Fig. 7 is an enlarged fragmental sectional view, showing the manner of restricting the entrance and exit of the pressure carrying medium.

Fig. 8 is a rear plan view of the operating lever and its mounting.

Fig. 9 is a perspective view of the indicating hand.

Fig. 10 is a perspective view of the connecting link, by which the operating lever and indicating hand are operatively connected.

Fig. 11 is a perspective view of the operating lever.

Fig. 12 is a side elevation of the pressure tank.

Fig. 13 is a cross sectional view taken on the line 13—13 of Fig. 12.

Fig. 14 is a fragmental vertical section of the lower end of the pressure pipe which is secured within the pressure chamber.

In the construction of our device we employ a liquid container 15. This liquid container is provided with an opening 16, around which is secured a screw-threaded flange 17. Resting on this flange is a plate 18 which is secured on the flange by means of a screw-threaded ring 19. The plate 18 is provided with a centrally located screw-threaded boss 20 in which a tapered nut 21 is seated. This nut is preferably split, so that on being screwed into the screw-threaded boss, it will contract and securely bind the pressure pipe 22. This pressure pipe has a portion near its lower end cut away, as indicated by the numeral 23. The portion 24 below this opening may be flattened. The purpose of this is to permit the pipe 22 to be secured within the pressure chamber 25. The air pressure chamber is closed at its top as at 26, while its bottom end is open. At intervals along the lower edge of the pressure chamber 25 are formed vertical indentations 27, and also circumferential indentations 28. These indentations are adapted to receive points 29 which are pressed inwardly on the sides of the cap 30. These indentations are first slipped upward into the indentation or grooves 27 until they come in line with the circumferential indentations 28, (see Fig. 13) after which the cap is given a turn, thereby seating the indentations on the cap in the grooves 28, thus securely holding the cap in position on the pressure chamber. The cap 30 is provided with vent openings 31, which are formed in the bead or indentation 31a,—this bead may be concentric with the cap. The purpose of forming this bead is to catch air or a pressure carrying medium entrapped by the liquid in the tank when low and agitated, and direct it to the openings 31 through which it passes and lodges beneath the baffle 33. The openings 31 also permit the ingress and egress of liquid. The cap 30 and baffle 33 forming an auxiliary chamber for receiving the additional supply of pressure carrying medium to be delivered to the pressure chamber, and while permitting free access of liquid from the tank, prevents the side wash of liquid in the tank, due to violent agitation, from entering the auxiliary chamber and carry away the pressure carrying medium lodged therein. The liquid is also permitted to pass beneath the pressure chamber or into the auxiliary chamber, by means of the passage way 32, which are formed by the vertical groove 27 and the cap 30. The purpose of the cap 30, as aforesaid, is to hold the liquid underneath the pressure chamber against side wash, and prevent the pressure carrying medium beneath the baffle from being carried away by the agitation of the liquid, while the vent openings 31 and passages 32 permit the liquid within the container to exert pressure to the pressure carrying medium within the chamber.

Located within the pressure chamber is a baffle 33, which is provided with vents 34, permitting a pressure medium to pass into the pressure chamber and liquid to pass out. Extending through the top 26 and baffle 33 is a pipe 35. This pipe may have its lower end 36 bent at a right angle as indicated in the drawings, or the lower end 36 may be carried straight down, but in both instances, it is preferable to have the end 36 terminating below the bottom edge of the pressure chamber 25, so that it will always be immersed in liquid and sealed, thereby preventing pressure from the pressure chamber from backing up into the tube or pipe 35. The upper portion of the tube 35 may be loosely coiled around the pipe 22. The upper end of the pipe 35 terminates in an enlargement or funnel 37. This enlargement or funnel is secured to a bracket 38, one portion of which is rigidly secured to the plate 18, the other portion is provided with arms 39, which embrace the pipe 22. The purpose of this connection and the coiling of the pipe 35 is to permit the adjustment of the air chamber 25 within liquid containers of varying depths. In other words, the pressure chamber can be moved upward or downward by loosening the nut 21 and raising or lowering the pipe 22 as is required without changing the distance between the upper edge of the funnel or enlargement 37, and the undersurface of the plate 17, so that the funnel or enlargement will always remain at a fixed distance from the top of the liquid container, regardless of its depth. Secured to the upper end of the pipe 22 is a pressure line 40. This pressure line has its free end secured in the projecting end 41 of a coupling sleeve 42. The coupling sleeve 42 is cylindrical in shape, and is provided on its opposite end with a projection 43. The coupling sleeve 42 is designed to fit snugly within a hollow lug 44, and is secured therein by means of a nut 45. In this way the sleeve is supported at both ends, or in other words, both projections are supported, which prevents the sleeve from rocking and becoming loose. In order to make a leak tight joint, a resilient gasket 46 is placed within the hollow lug 44, and the end 43 of the coupling 42 passes therethrough. This end extending into the opening 44a provided in the lug 44, and upon tightening the nut 45, the gasket is compressed, and the end 43 enters the opening 44a of the hollow lug,— the gasket filling up any rough or irregular surfaces, and making a tight joint.

The gage housing consists of a cylindrical cup-shaped member provided with an outwardly extending flange 47, which is adapted to bear against the instrument board 48. The gage housing has a side wall 49 which is reduced in diameter near its rear end as indicated by the numeral 50 forming a shoulder, the back 51 of the housing is provided with a centrally located outwardly extending lipped edge 52, and surrounding this lipped edge, and spaced apart therefrom, is a circular bead 53, to which are connected radially extending beads 54. These beads not only stiffen the back, but also permit pressure to be distributed more rapidly and quickly throughout the diameter of the gage housing, while that portion between the radially extending beads prevents the collapse or backward drawing of the diaphragm, especially when the vacuum system is used, as this backward drawing has a tendency to ruin the diaphragm. The hollow lug 44 is fastened to the back of the case and is provided with a shoulder 55 against which with the lipped edge 52 abuts, and within the opening formed by the lipped edge 52 is inserted a porous regulating washer which rests against the shoulder 55. This washer may consist of sheets of perforated or reticulated material 56, between which may be placed a layer of porous or fibrous material 57. After the regulating washer has been inserted into place, a washer 58 is pressed into the lipped edge, and against the regulating washer. The amount of pressure exerted by the last mentioned washer against the regulating washer controls especially in the case of fibrous material its resistance to the passage of pressure carrying medium by making it more or less dense. After this operation has been completed, a diaphragm 59 is placed within the housing. This diaphragm is provided with concentric corrugations so that it can cup or dish readily under varying pressures. The diaphragm is held in position within the casing preferably by means of solder or similar material 60, which not only secures it within the casing, but prevents any leakage along its edges. This diaphragm is provided at its center with an outwardly extending hook 61. After the diaphragm has been placed in position and secured within the housing, a cup-shaped mounting plate 62 is forced into position, and supported on the shoulder formed by the reduced part of the housing (see Figs. 2 and 3) the shoulder 50 limiting the depth of insertion. This cup-shaped plate also limits the bulging movement of the diaphragm, so that it can only be forced outward from the back of the housing a predetermined distance, and thus prevents distortion of the diaphragm, and also any distortion of the housing, especially that portion adjacent the diaphragm which would force the diaphragm out of true, and thus affect the accuracy of the instrument. In other words, the mounting plate acts as a brace, making the side wall of the housing adjacent the diaphragm rigid. The mounting plate 62 is provided with an elongated opening 63 through which the hook 61 extends, and secured to the mounting plate 62 is a frame 64 which may be stamped from a single piece of material, and is provided adjacent the mounting plate with ears 65, through which pivots 66 extend. These pivots are provided on their ends with journals which extend through openings formed in the ears 67 of the operating lever 68.

The operating lever may be constructed of light non-corrosive metal, such as aluminum, and is provided with a curved bifurcated extension 69, into which the hook 61 extends, and the operating lever is also provided with an integrally formed bell crank lever 70, to which one end of a connecting link 71 is secured. The connecting link is of relatively thin spring material, such as nickel alloy, and is twisted so that it can bend both vertically and horizontally. The forward portion of the frame 64 is provided with ears 72 and 73 through which pivots 74 are passed and secured. These pivots are also provided with journals which enter the openings 75 formed in the lower portion of the indicator hand 76. This lower portion is substantially S-shaped. The two short arms having openings 75, while the long connecting arm of the S is provided with a pivot or crank pin 77 placed eccentric to the openings 75. Or in other words, placed eccentric to the axis of the hand, so that any pushing or pulling on the crank pin 77 will rock the hand on its axis. This construction of hand enables us to form the same out of a single piece of material, and obviates the possibility of the axis getting out of line, as well as supporting the hand at all points, and on independent journals. One end of the connecting link 71 is adapted to be placed over or secured to the crank pin, and is for the purpose of operating the hand when the bell crank lever is moved by the diaphragm.

The pin 77 also serves to hold one end of a hair spring 79. The opposite end of this spring is secured at 80 to the frame 64. The hair spring is preferably so tensioned as to normally force the hand away from the empty position, although its tension may be reversed. One purpose of this is to prevent any lost motion which may occur between the diaphragm and hand. In other words, any lost motion between the operating lever and diaphragm, or lost motion in the journals is taken care of. Another purpose of the hair spring is to make the device more sensitive. This sensitiveness is accomplished by the fact that the diaphragm will not have to push the operating parts when it bulges, and will not have to overcome the tension of a hair spring, while if any lost motion were present between the hook and diaphragm, or in the bearings, and not taken care of, there would be an error in the reading or indication of the gage.

Carried by the frame 64 is a dial 81, which is provided with a curved slot 82, through which the indicator hand 76 extends. The dial is provided with an embossed or pressed out portion 83, which permits the main portion of the dial to rest snugly against the frame 64, but still clear the front pivot 74.

After the device has been thus far assembled, a ring 84 containing a glass 85 is pushed within the housing 49. The ring 84 is provided with a bead 86, which prevents the ring from entering the housing too deeply, and within the bead 86 is placed a spring retaining ring 87, which holds the glass 85 in position. The housing 49 is also provided with a vent 88, which allows the free passage of air and prevents pressure or vacuum being formed, due to temperature changes between the front of the diaphragm and glass. Any formation of pressure or vacuum in this part of the gage would affect its accurate working.

The opposite end of this pressure line terminates in the upper portion of the liquid receptacle, so that in the event of pressure being set up within the liquid receptacle, it is transferred to the front of the diaphragm, which equalizes the excess pressure so that nothing but the pressure set up by the liquid within the pressure chamber is indicated by the gage. To the back of the housing are secured screw-threaded studs 89, over which is placed a spring clamp 90. This spring clamp is U-shaped, and is adapted to bear against the rear side of the instrument board, so as to hold the housing in position. The clamp 90 is provided with an opening 91 of sufficient size to allow the connections 44 and 45 to freely pass therethrough, and is provided with recesses 92, which surround the openings through which the studs 89 pass. These recesses are so shaped as to substantially conform to the outer contour of the securing nuts 93 which are mounted on the studs 89, and act as nut locks to prevent the accidental loosening of these nuts. This locking action is performed by making the clamp out of spring material so that when the nuts are forced in either direction by a wrench, the clamp will bend sufficiently to allow the loosening or tightening of the nuts, but at the same time hold them against turning, due to vibration.

The indicator hand 76 may give a greater or less throw in proportion to the movement of the diaphragm 59 by bending the hook 61 to or from the journals which support the operating lever, thus lengthening or shortening the distance between the point where the movement is imparted by the diaphragm and the pivot points. In other words, if the hook is bent toward the pivot points, a greater throw of the indicator hand is obtained for a certain amount of movement to the diaphragm, than where the hook is at a greater distance from the pivot points, because the leverage in this instance has been shortened as to the point where the power is applied, and consequently, a greater distance will be imparted by the bell crank lever to the indicator hand. In other words, the ratio of movement between the diaphragm and indicator hand is controlled or governed by the adjustment of the hook 61 to or from the journals formed on the pivots 66.

This invention is an improvement on the inventions disclosed in the applications of James Maccallum, Jr., filed May 27, 1920, Serial No. 384,632, and filed June 5, 1920, Serial No. 386,674.

Having fully described our invention, what we claim is:

In a liquid quantity indicating device for containers having a variable quantity of liquid therein comprising the combination with a pressure gauge and its housing, a pressure chamber submerged in the liquid within the container and communicating with the liquid at the full depth to be measured, means adapted to receive liquid and air while liquid is being supplied to the container, said means adapted to conduct said air downward and deliver the same to the pressure chamber for maintaining a constant volume of air therein and a pressure transmitting conduit connecting said chamber and gauge housing, of a pressure responsive diaphragm located in said housing, means located in said housing for limiting the forward movement of said diaphragm when pressure passing through said conduit acts on said diaphragm, pervious means for controlling the rate of speed at which the pressure fluid from the pressure chamber can pass to and from said pressure responsive diaphragm, adjustable means for predetermining the density of said pervious means, and an indicating hand formed from a single piece of material and having a body portion substantially S shaped pivotally mounted in said housing, aligned bearings formed in the body portion of said hand, a pin located in the body portion of said hand and out of alignment with the axis of said bearings, and means for operatively connecting said pin to said diaphragm whereby said hand is moved on its bearings by said diaphragm.

In testimony whereof, we have signed our names to this specification.

JAMES MACCALLUM, Jr.
EDWARD R. POWELL.